United States Patent Office

3,383,421
Patented May 14, 1968

3,383,421
PROCESS FOR THE FORMATION AND PURIFICATION OF AROMATIC SULFONES
Daniel W. Fox and Popkin Shenian, Pittsfield, Mass., assignors to General Electric Company, a corporation of New York
No Drawing. Filed Mar. 1, 1965, Ser. No. 436,303
4 Claims. (Cl. 260—607)

ABSTRACT OF THE DISCLOSURE

Process for the formation and purification of a bis(3,5-dialkyl-4-hydroxyphenyl)-sulfone comprising reaction of sulfuric acid with a phenol within a temperature range of 155 to 170° C., in the presence of an organic liquid capable of forming an azeotrope with the water of reaction, and recovery of sulfone by dissolution in an aqueous caustic or ammonia media followed by neutralization to pH of between 4 and 6.

---

This invention relates to a process for the preparation and purification of aromatic sulfones. More particularly this invention relates to a process for the preparation and purification of bis(3,5-dialkyl-4-hydroxyphenyl)-sulfones by reaction of an appropriate phenol with sulfuric acid in the presence of an organic liquid capable of forming an azeotrope with water of reaction, and dissolution of the sulfones in an aqueous caustic or ammonia media followed by neutralization with an acid to a pH of between 4 and 6.

The process for forming diphenyl sulfones by reacting a phenol with sulphuric acid or with another sulfonating agent is known. However, the formation of the diphenyl sulfones was normally accompanied by the formation of various color bodies and other impurities. In the prior art, the diaryl sulfones are characterized as pink, rust or brown crystals. This characterization is an indication that the diphenyl sulfones contain the impurities mentioned above.

Heretofore, the diphenylsulfones have been used as plasticizers, wetting agents, agents for combating pests, auxiliary substances for use in canning, dyestuffs, etc. For all of these applications, the impurities present in the diphenyl sulfones are not objectionable. However, it has now been proposed that certain diphenyl sulfones be used as monomeric materials for the formation of various high molecular weight polymers and copolymers. When used in this manner, the impurities which accompany sulfone formation prevent formation of high molecular weight polymer by chain termination, uncontrolled branching and/or cross-linking and also predispose the products to various degradation processes. In addition to this, the color bodies also present as impurity in the diphenylsulfone impart a pink, rust or brown discoloration to the polymer. In the prior art, there are references to a pure white diphenyl sulfone. However, in order to produce such a colorless sulfone, complex reaction systems and recrystallation processes are involved. It would, therefore, be highly desirable to find a method for the preparation of a monomeric diphenyl sulfone having high purity through the simple reaction of sulphuric acid with a corresponding phenol.

I have now unexpectedly found that by careful control of certain reaction conditions followed by a facile recovery procedure, I can produce a diphenyl sulfone substantially free of color bodies by a process involving reaction of a phenol precursor with sulfuric acid.

Accordingly, one object of this invention is to provide a process for the formation of a diphenyl sulfone by the reaction of a phenol with sulphuric acid.

Another object of this invention is to provide a process for the preparation of diphenyl sulfones of high purity by the reaction of a phenol with sulphuric acid followed by a facile recovery procedure.

Other objects and advantages of this invention will be in part pointed out and in part apparent from the description which follows.

The process of my invention can be represented by the following equation:

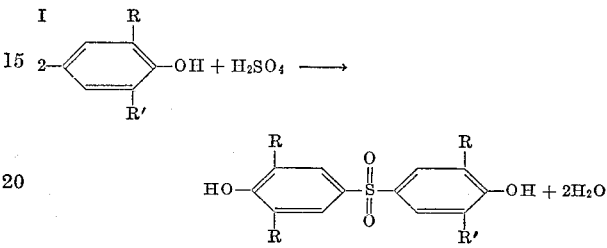

wherein R and R' each represent an alkyl group having up to 4 carbon atoms where R and R' need not be the same. The expression "2,6 dialkylphenol" will be used throughout the remainder of this specification to describe the phenols corresponding to those in the above equation having an alkyl group with from 1 to 4 carbon atoms. A distinguishing feature of this invention is that the reaction of the phenol and sulfuric acid is carried out at a temperature ranging between 155–170° C. at temperatures below 155° C., sulfonation of the phenol proceeds, but the formation of the sulfone is too slow to be of importance. At temperatures in excess of 170° C., the sulfone formation proceeds rapidly, but the sulfone formed contains substantial impurity. In addition to close control of temperature, it is desirable to perform the reaction in the presence of an organic liquid capable of forming an azeotrope with the water of reaction such as heptane. The azeotroping agent makes it possible to remove the water formed by the reaction during the period of conversion to the sulfone. In the preferred embodiment of this invention, the diphenyl sulfone product is dissolved in aqueous caustic or ammonia solution and precipitated by neutralizing with acid. By control of pH between 4 and 6, the diphenyl sulfone precipitates with impurities remaining dissolved in solution.

In U.S. Patent Ser. No. 2,556,429, a method is disclosed for the preparation of an isomeric mixture of diaryl sulfones, i.e., sulfones of ortho, meta and para xylene and ethyl benzene. The object is to provide a mixture of diaryl sulfones liquid at room temperatures and useful as a plasticizer. The process comprises reacting a mixture of ortho xylene, meta xylene, para xylene, and ethyl benzene with sulphuric acid. The reaction is maintained at an elevated temperature with provision for removal of the water of reaction. The sulfonation reaction is reported to take up to 10 hours and no less than 4 hours. The sulfonation reaction is terminated when between 40–45 percent of the intermediate sulfonic acid is converted to the sulfone. The process of this patent is distinguishable from the present invention inasmuch as the desired product is not a solid diphenyl sulfone, but a mixture of sulfones liquid at room temperature. In addition, the mixture is colored.

In British Patent 820,659, there is disclosed a process for the formation of sulfones from phenols. Low melting phenols are treated with liquid sulphur trioxide in approximately stoichiometric proportions to form the desired sulfone. The reaction is carried out initially at a temperature of between 70–90° C. This temperature is maintained constant until all of the sulphur trioxide is added to the reaction vessel. Thereafter, the temperature is raised to and held at 95° C. for an additional period of one and one-half hours. The patent also discloses a process for the trisulfonation of phenol which employs the same procedure, except that the temperature is maintained at 150° C. In one particular example, liquid sulphur trioxide is added to molten 2,6-xylenol and upon completion of the addition of the sulfur trioxide, the temperature is raised to 175° C. and maintained at that temperature for 4 hours. The water formed during the sulfone formation is allowed to escape from the system during the reaction. The product resulting from this reaction is designated as a rust colored solid of a melting point of approximately 296° C. This indicates that the bis-(3,5-dimethyl-4-hydroxyphenyl)-sulfone was formed, but the rust coloration also indicates that the sulfones so formed contained impurities.

In U.S. Patent 2,122,958, a process for the preparation of sulfones free of color bodies and other by-products was reported. In this process, sulphuric acid is reacted with a phenol at a temperature of from 100–110° C. for a period of one-half to one hour to form a sulfonic acid of the phenol followed by reaction with molten phenol at a temperature maintained between 120 to 130° C. at reduced pressure. Thus, according to this process, it is necessary to form the reaction in two steps. The formation of the sulfonic acid by reaction with sulphuric acid and the second step comprising the formation of the sulfones at reduced pressures. A process of this nature requires expensive equipment for formation of the sulfone in production scale. Furthermore, the product of this reaction is referred to as a crystalline material which is very light in color. This indicates that while the sulfone is purer than the sulfones produced by other methods, some impurities are still present.

In addition to the processes listed above, other methods have been attempted to eliminate the impurities accompanying diphenylsulfone formation. Thus, chlorosulfonic acid and dimethyl pyrosulfate have been used as sulfonating agents in place of sulphuric acid. Also, absorption techniques have been employed such as passage of the sulfones through a bed of clay, charcoal, alumina or silica to absorb impurities. All of these methods have failed to produce a pure diphenylsulfone suitable for use in the formation of linear high molecular weight polymers.

To form diphenylsulfones by the process of this invention, a 2,6-dialkyl phenol where the alkyl groups have from 1 to 4 carbon atoms each, and an azeotrope former with water of reaction are charged to a reactor, preferably equipped with a stirrer and reflux condenser. The azeotrope former is one that does not react with sulfuric acid and phenol under the reaction conditions. In addition, it should have a boiling point capable of providing a reaction temperature of between 155–170° C. In general, aliphatics and chlorinated aliphatics are suitable, Typical examples include hexane, n-octane, isooctane, chlorohexane, chlorooctane, etc. Heptane is preferred. It has been found that approximately 0.2 mole of the azeotroping material per mole of phenol is desirable. However, the quantity of azeotroping material may vary between 0.1–2 moles per mole of phenol. Regulation of the quantity of azeotrope forming material within this range has been found to be a convenient method of regulating the temperature of the reaction mixture. The mixture in the the reaction vessel is then heated to a temperature of between 50–60° C. and sulfuric acid is added slowly. Theoretically, 2 moles of phenol are needed per mole of sulfuric acid, but in practice, it has been found that in order to minimize by-product formation, it is desirable to add an excess of phenol. Thus, for evrey 2 moles of phenol used, between 0.7 and 0.9 mole of sulfuric acid is added. The reason for the excess phenol in to minimize formation of trifunctional sulfones. Following the addition of sulfuric acid, the reaction mixture is heated to a temperature between 155–170° C. This temperature range is critical and a variance from this range will result in either poor yields or undesirable color bodies.

While not wishing to be bound by theory, it is believed that the bulk of the detrimental impurities are formed through oxidation reactions. It is believed that one color body in the diphenylsulfone products is a sulfonaphthalein.

This is a pH indicator type complex which is maximally colored in the alkaline state. This coloration is a convenient way of determining the purity of the diphenyl sulfones. An aqueous alkaline solution prepared by reacting a 2,6-dialkylphenol with sulfuric acid at temperatures exceeding 170° C. will generally be a highly colored, dark reddish purple. It is not possible to see through solutions containing more than a few percent of this impure product. Successive recrystallizations of the impure diphenyl sulfone will produce progressively lighter colored products, however, with as many as three recrystallization steps, a pinkish coloration is still evident. A diphenyl sulfone produced according to the process of this invention yields a colorless alkaline solution. This is due to the lack of pH indicator type complex impurities.

Other impurities believed to be present in diphenyl sulfones formed by prior art sulfonation reactions include quinone type color bodies, sulfonic acid derivatives and sulfone isomers.

By the process of this invention, it is believed that the above mentioned impurities are not formed. The addition of an azeotroping material, such as heptane to the reaction mixture provides an inert blanket over the reaction mixture that prevents oxidation from the atmosphere and also provides a convenient and easy method for the fast removal of the water of reaction. Sulphuric acid is an oxidizing agent and becomes a stronger oxidizing agent with elevated temperatures. Therefore, the temperature of reaction is very critical. The temperature must be maintained at a level which will enable the reaction to proceed sufficiently fast to be practical and to give sufficiently high yields. However, the temperature must not be so high as to allow the sulphuric acid to behave as a strong oxidizing agent and thus form the undesirable color bodies. Accordingly, the temperature range of 155–170° C. is critical.

The reaction mixture of sulphuric acid, phenol and heptane is maintained at a temperature range of 155–170° C. for a period of time ranging between one and one-half to three hours. During this period, water of reaction formed is continuously removed. At the conclusion of the reaction, the diphenylsulfone is caked on the sides of the reaction vessel. It is removed by adding an organic liquid which will not dissolve the diphenylsulfone, but will dissolve unreacted phenol and impurities and not react with residual phenol or traces of sulfonic acid and phenol sulfuric acids. Suitable liquids include alcohols such as methanol, ethanol, propanol, etc. To insure a minimum of occluded by-products in the crystalline product the reaction vessel is again heated under reflux. Thereafter, the diphenyl sulfone is collected by filtering and the filter cake is washed with an acidified alcohol solution.

The product so formed is purer than that heretofore produced by reaction of a sulphuric acid with a phenol. However, in order to form a high grade polymer, it is desirable to employ a further purification step. This purification step comprises dissolving the diphenylsulfone in caustic or ammonia solution and neutralizing, with acid to pH of from 4 to 6 to precipitate the diphenyl sulfone. The addition of an alcohol to the solution of the sulfone prior to the step of adding the acid results in an even purer product, as the alcohol tends to maintain the impurities in solution.

The product obtained by the process outlined above is a snow-white crystalline material. The preferred sulfone of this invention—i.e., bis(3,5-dimethyl-4-hydroxyphenyl)-sulfone has a melting point ranging between 294–297° C.

The following examples serve to illustrate the invention in more detail, but should not be construed as limiting the invention thereto.

Example 1

A 500 ml. flask was equipped with a thermometer, an agitator and a condenser equipped with a Dean Stark trap for collecting water. A charge of 122 g. of 2,6-xylenol and 20 ml. of heptane were added to the flask. The flask was then heated to a temperature ranging between 50–60° C. Approximately 40 g. of concentrated sulphuric acid were added to the mixture of heptane and xylenol over a period of five minutes. Thereafter, the reaction vessel was heated to a temperature of 155–170° C. and maintained within this temperature range under mild reflux conditions until 13 ml. of water were collected in a Dean Stark trap. This operation requires from about one and one-half to three hours. During the reaction, sulfone begins to cake on the sides of the reaction vessel and at the conclusion of the reaction, a thick cake of sulfone is evident. At the end of the reaction period, the reaction mixture is cooled to about 60° C. and 100 ml. of methyl alcohol are added. The vessel is again heated to approximately 80° C. and allowed to reflux at this temperature for a period of about thirty minutes. During this refluxing operation, the vessel is agitated so as to flake the white cake of sulfone off the side of the reaction vessel to yield a slurry. Following the reflux step, the mixture is again cooled to room temperature and the reaction mixture is filtered through a Buchner funnel. The filter cake is washed with a solution comprising 50 ml. of methyl alcohol and 50 ml. of water. The yield is approximately 62 g. of a white, crystalline bis(3,5-dimethyl-4-hydroxyphenyl)-sulfone. The sulfone so formed is then dissolven in 150 g. of a 10 percent caustic solution. About 300 ml. of methyl alcohol are added to the solution. The mixture is then agitated and slowly neutralized with acetic acid to pH of from 4–6. During the course of the neutralization the product precipitates as a fine, white powder, which is separated by filtration. The precipitate is washed with a 50–50 mixture of 100 ml. of methyl alcohol and water and dried in an oven at 100° C. for twenty-four hours. The yield is 52 g. of a snow-white, pure bis-(3,5-dimethyl-4-hydroxyphenyl) sulfone having a melting point of approximately 296° C.

Example 2

This example is designed to show the criticality of temperature control.

A solution was prepared comprising 3 moles of xylenol, 1 mole of sulphuric acid and approximately two-tenths of a mole of heptane. A stream of nitrogen was passed over the solution and the solution was heated to a temperature of approximately 145° C. The solution was maintained at this temperature for a period of approximately seven hours. At the conclusion of this period, the solution was cooled and the solid formed was removed. Its solid was washed with isopropyl alcohol, dried and weighed. The yield was 43 g. of a white crystalline bis(3,5-dimethyl-4-hydroxyphenyl)-sulfone or 14% of theoretical.

The procedure was repeated with temperature maintained between 180–185° C. The reaction was run for an additional two hours before cooling. At the conclusion of the two-hour period, the sulfone was removed, washed with isopropyl alcohol, dried and collected. The product had a relatively dark red color and weighed 102 g. Several recrystallizations from acetane failed to completely remove all color. The red coloration is an indication that the high temperature of reaction caused oxidation resulting in the formation of undesirable dyes.

Example 3

This example is designed to illustrate a preferred pilot plant procedure for the preparation of a bis(3,5-dimethyl-4-hydroxyphenyl)-sulfone.

Thirty and one-half pounds of 2,6-xylenol and 0.6 gallon of heptane are charged to a reactor. An agitator is turned on and the reaction vessel brought and held at a temperature ranging between 50–55° C. Thereafter, sulphuric acid is slowly added at the rate of 50 cubic centimeters per minute. A total sulphuric acid content of 2,475 cc. is added. The reaction vessel is then heated to reflux, i.e., a temperature ranging between 165–170° C. This temperature is held for a period of two hours. During this two-hour period, the water formed by the reaction is removed, via a condenser in the discharge line. A total of between 1400–1500 ml. of water should be collected during the reaction. After all of the water of reaction is removed, the reaction mixture is cooled to approximately 45° C. Approximately one and one-half gallons of isopropyl alcohol are then added to the reaction mixture to dissolve impurities. To insure complete dissolution of the impurities, the reaction is again heated with agitation to 80° C. and held at this temperature for approximately thirty minutes. The reactor is then cooled to around 50° C. and one and one-half gallons of water added. The reactor is then cooled to room temperature. Thereafter, the sulfone formed is removed by filtering in a stoneware filter. The filter cake formed is washed with five gallons of a 50 percent isopropyl alcohol-50 percent water mixture and then with 10 gallons of water. The washed filter cake is added to a drum along with 27 quarts of a 10 percent aqueous caustic soda solution. This solution is stirred until the sulfone is dissolved. The solution is then filtered through a stoneware filter to remove solid impurities. Thereafter, a 10 percent hydrochloric acid solution is slowly added to the solution until a pH of between 4–6 is obtained. This causes precipitation of the sulfone which is collected by filtering the mixture through a stoneware filter. The filter cake is washed with water until free of alkali.

The white crystalline product is exposed to air at 100° C. until dry. It melts between 296–297° C. An alkaline solution of the product is essentially colorless.

What I claim as new and desire to secure by Letters Patent of the United States is:

1. A process for the preparation of a white, crystalline diphenylsulfone of the formula

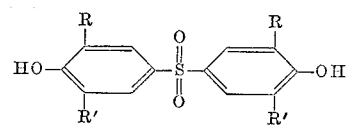

where R and R' are lower alkyl having from 1 to 4 carbon atoms, said process comprising the steps of:
 (a) reaction of a 2,6-dialkyl phenol where each alkyl group has from 1 to 4 carbon atoms with sulfuric acid within a temperature range of 155 to 170° C. in the presence of an organic liquid capable of forming an azeotrope with the water of reaction, the azeotrope having a boiling point within the reaction temperature range,
 (b) recovering diphenylsulfone from reaction mixture;
 (c) dissolving said diphenylsulfone in aqueous solution of caustic soda or ammonia;
 (d) neutralizing the aqueous solution with acid to pH ranging between 4 and 6; and
 (e) collecting the diphenylsulfone in the form of white crystals.

2. The process of claim 1 wherein water of reaction is removed continuously as formed by azeotropic distillation.

3. The process of claim 1 wherein both R and R' are methyl.

4. The process of claim 1 where the azeotrope is formed from heptane and water.

References Cited

UNITED STATES PATENTS 3,065,274 11/1962 Vegter et al. ......... 260—607
3,185,628 3/1965 Fetscher et al. ..... 260—607 X

OTHER REFERENCES

Zehenter, Journal fur Praktische Chemie, vol. 137, pp. 216–219 (1953).

Zehenter, Journal fur Praktische Chemie, vol. 139, pp. 309–312 (1934).

CHARLES B. PARKER, *Primary Examiner.*

JOSEPH P. BRUST, *Examiner.*

D. R. PHILLIPS, *Assistant Examiner.*